US008660854B1

(12) United States Patent
Gustafson

(10) Patent No.: US 8,660,854 B1
(45) Date of Patent: Feb. 25, 2014

(54) RAPID SYNDROME ANALYSIS APPARATUS AND METHOD

(75) Inventor: Tracy L. Gustafson, Mesquite, TX (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 1498 days.

(21) Appl. No.: 11/089,660

(22) Filed: Mar. 24, 2005

(51) Int. Cl.
G06Q 50/00 (2012.01)
G06Q 10/00 (2012.01)

(52) U.S. Cl.
USPC .................................................. 705/2; 705/3

(58) Field of Classification Search
USPC .......................................................... 705/2
See application file for complete search history.

(56) References Cited

U.S. PATENT DOCUMENTS 5,651,100 A * 7/1997 Hayashi et al. ................. 706/52

OTHER PUBLICATIONS

Lewis, Disease outbreak detection system using syndromic data in the greater Washington DC area, Am J Prev Med. Oct. 2002;23(3):229-30.*
DARPA Bio-ALIRT Program Technical Report, "Evaluation of Algorithms for Outbreak Detection Using Clinical Data from Five U.S. Cities" (Oct. 15, 2004).
Ryan, TP. "Statistical Methods for Quality Improvement" John Wiley & Sons, New York, (1989) pp. 110-112.

* cited by examiner

*Primary Examiner* — Tran Nguyen
(74) *Attorney, Agent, or Firm* — Lerner, David, Littenberg, Krumholz & Mentlik, LLP

(57) ABSTRACT

In a computer; a computer readable medium for providing rapid syndrome analysis includes instructions for measuring a plurality of CUSUMs simultaneously and generating CUSUM data in response to an observed value. It also includes instructions for comparing the CUSUM data with a predetermined plurality of threshold values and instructions for generating a signal when the CUMSUM data exceeds any of the plurality of threshold values by a predetermined amount.

14 Claims, 5 Drawing Sheets

EXAMPLE CALCULATIONS for 4 Days
Note: This example only includes the Cusums for the 7-Day Moving Window

| Flag | Color | Interval | Observ. Date | Observed Value | Weighted Moving Mean | Weighted Moving Sigma | S(t-1) | Q | K | Adjust | Cusum S(t) | H | FIR Cusum (Reset if < 0 or > H) |
|---|---|---|---|---|---|---|---|---|---|---|---|---|---|
| None | Blue | 7 | 3/31/2004 | 5 | 4.4583 | 0.5382 | 0.0000 | 1.0065 | -2.00 | 0.25 | -0.7435 | 3.00 | 0.0000 |
| None | Yellow | 7 | 3/31/2004 | 5 | 4.4583 | 0.5382 | 0.0000 | 1.0065 | -2.75 | 0.25 | -1.4935 | 4.00 | 0.0000 |
| None | Orange | 7 | 3/31/2004 | 5 | 4.4583 | 0.5382 | 0.0000 | 1.0065 | -3.50 | 0.25 | -2.2435 | 5.00 | 0.0000 |
| None | Red | 7 | 3/31/2004 | 5 | 4.4583 | 0.5382 | 0.0000 | 1.0065 | -4.25 | 0.25 | -2.9935 | 6.00 | 0.0000 |
| None | Blue | 7 | 4/1/2004 | 7 | 4.6786 | 0.5044 | 0.0000 | 4.6020 | -2.00 | 0.25 | 2.8520 | 3.00 | 2.8520 |
| None | Yellow | 7 | 4/1/2004 | 7 | 4.6786 | 0.5044 | 0.0000 | 4.6020 | -2.75 | 0.25 | 2.1020 | 4.00 | 2.1020 |
| None | Orange | 7 | 4/1/2004 | 7 | 4.6786 | 0.5044 | 0.0000 | 4.6020 | -3.50 | 0.25 | 1.3520 | 5.00 | 1.3520 |
| None | Red | 7 | 4/1/2004 | 7 | 4.6786 | 0.5044 | 0.0000 | 4.6020 | -4.25 | 0.25 | 0.6020 | 6.00 | 0.6020 |
| Flag | Blue | 7 | 4/2/2004 | 6 | 4.6250 | 0.5229 | 2.8520 | 2.6295 | -2.00 | 0.25 | 3.7315 | 3.00 | 1.5000 |
| None | Yellow | 7 | 4/2/2004 | 6 | 4.6250 | 0.5229 | 2.1020 | 2.6295 | -2.75 | 0.25 | 2.2315 | 4.00 | 2.2315 |
| None | Orange | 7 | 4/2/2004 | 6 | 4.6250 | 0.5229 | 1.3520 | 2.6295 | -3.50 | 0.25 | 0.7315 | 5.00 | 0.7315 |
| None | Red | 7 | 4/2/2004 | 6 | 4.6250 | 0.5229 | 0.6020 | 2.6295 | -4.25 | 0.25 | -0.7685 | 6.00 | 0.0000 |
| Flag | Blue | 7 | 4/3/2004 | 7 | 4.5357 | 0.5387 | 1.5000 | 4.5747 | -2.00 | 0.25 | 4.3247 | 3.00 | 1.5000 |
| Flag | Yellow | 7 | 4/3/2004 | 7 | 4.5357 | 0.5387 | 2.2315 | 4.5747 | -2.75 | 0.25 | 4.3061 | 4.00 | 2.0000 |
| None | Orange | 7 | 4/3/2004 | 7 | 4.5357 | 0.5387 | 0.7315 | 4.5747 | -3.50 | 0.25 | 2.0561 | 5.00 | 2.0561 |
| None | Red | 7 | 4/3/2004 | 7 | 4.5357 | 0.5387 | 0.0000 | 4.5747 | -4.25 | 0.25 | 0.5747 | 6.00 | 0.5747 |

| Interval | Color | H | K | FIR Cusum |
|---|---|---|---|---|
| 7 day | Blue | 3.0 | 1.75 | 1.5 |
| 7 days | Yellow | 4.0 | 2.50 | 2.0 |
| 7 days | Orange | 5.0 | 3.25 | 2.5 |
| 7 days | Red | 6.0 | 4.00 | 3.0 |
| 14 days | Blue | 3.0 | 1.50 | 1.5 |
| 14 days | Yellow | 4.0 | 2.25 | 2.0 |
| 14 days | Orange | 5.0 | 3.00 | 2.5 |
| 14 days | Red | 6.0 | 3.75 | 3.0 |
| 21 days | Blue | 3.0 | 1.25 | 1.5 |
| 21 days | Yellow | 4.0 | 2.00 | 2.0 |
| 21 days | Orange | 5.0 | 2.75 | 2.5 |
| 21 days | Red | 6.0 | 3.50 | 3.0 |
| 28 days | Blue | 3.0 | 1.00 | 1.5 |
| 28 days | Yellow | 4.0 | 1.75 | 2.0 |
| 28 days | Orange | 5.0 | 2.50 | 2.5 |
| 28 days | Red | 6.0 | 3.25 | 3.0 |

*FIG. 2*

EXAMPLE CALCULATIONS for 4 Days
Note: This example only includes the Cusums for the 7-Day Moving Window

| Flag | Color | Interval | Observ. Date | Observed Value | Weighted Moving Mean | Weighted Moving Sigma | S(t-1) | Q | K | Adjust | Cusum S(t) | H | FIR Cusum (Reset if <0 or >H |
|---|---|---|---|---|---|---|---|---|---|---|---|---|---|
| None | Blue | 7 | 3/31/2004 | 5 | 4.4583 | 0.5382 | 0.0000 | 1.0065 | -2.00 | 0.25 | -0.7435 | 3.00 | 0.0000 |
| None | Yellow | 7 | 3/31/2004 | 5 | 4.4583 | 0.5382 | 0.0000 | 1.0065 | -2.75 | 0.25 | -1.4935 | 4.00 | 0.0000 |
| None | Orange | 7 | 3/31/2004 | 5 | 4.4583 | 0.5382 | 0.0000 | 1.0065 | -3.50 | 0.25 | -2.2435 | 5.00 | 0.0000 |
| None | Red | 7 | 3/31/2004 | 5 | 4.4583 | 0.5382 | 0.0000 | 1.0065 | -4.25 | 0.25 | -2.9935 | 6.00 | 0.0000 |
| None | Blue | 7 | 4/1/2004 | 7 | 4.6786 | 0.5044 | 0.0000 | 4.6020 | -2.00 | 0.25 | 2.8520 | 3.00 | 2.8520 |
| None | Yellow | 7 | 4/1/2004 | 7 | 4.6786 | 0.5044 | 0.0000 | 4.6020 | -2.75 | 0.25 | 2.1020 | 4.00 | 2.1020 |
| None | Orange | 7 | 4/1/2004 | 7 | 4.6786 | 0.5044 | 0.0000 | 4.6020 | -3.50 | 0.25 | 1.3520 | 5.00 | 1.3520 |
| None | Red | 7 | 4/1/2004 | 7 | 4.6786 | 0.5044 | 0.0000 | 4.6020 | -4.25 | 0.25 | 0.6020 | 6.00 | 0.6020 |
| Flag | Blue | 7 | 4/2/2004 | 6 | 4.6250 | 0.5229 | 2.8520 | 2.6295 | -2.00 | 0.25 | 3.7315 | 3.00 | 1.5000 |
| None | Yellow | 7 | 4/2/2004 | 6 | 4.6250 | 0.5229 | 2.1020 | 2.6295 | -2.75 | 0.25 | 2.2315 | 4.00 | 2.2315 |
| None | Orange | 7 | 4/2/2004 | 6 | 4.6250 | 0.5229 | 1.3520 | 2.6295 | -3.50 | 0.25 | 0.7315 | 5.00 | 0.7315 |
| None | Red | 7 | 4/2/2004 | 6 | 4.6250 | 0.5229 | 0.6020 | 2.6295 | -4.25 | 0.25 | -0.7685 | 6.00 | 0.0000 |
| Flag | Blue | 7 | 4/3/2004 | 7 | 4.5357 | 0.5387 | 1.5000 | 4.5747 | -2.00 | 0.25 | 4.3247 | 3.00 | 1.5000 |
| Flag | Yellow | 7 | 4/3/2004 | 7 | 4.5357 | 0.5387 | 2.2315 | 4.5747 | -2.75 | 0.25 | 4.3061 | 4.00 | 2.0000 |
| None | Orange | 7 | 4/3/2004 | 7 | 4.5357 | 0.5387 | 0.7315 | 4.5747 | -3.50 | 0.25 | 2.0561 | 5.00 | 2.0561 |
| None | Red | 7 | 4/3/2004 | 7 | 4.5357 | 0.5387 | 0.0000 | 4.5747 | -4.25 | 0.25 | 0.5747 | 6.00 | 0.5747 |

FIG. 5

RAPID SYNDROME ANALYSIS APPARATUS AND METHOD

FIELD OF THE INVENTION

This invention relates to a rapid syndrome analysis apparatus and method. In particular, according to one embodiment, the invention relates, in a computer, to a computer readable medium for providing rapid syndrome analysis including instructions for measuring a plurality of CUSUMs simultaneously and generating CUSUM data in response to an observed value. Further, instructions are provided for comparing the CUSUM data with a predetermined plurality of threshold values. Finally, instructions are provided for generating a signal when the CUSUM data exceeds any of the plurality of threshold values by a predetermined amount.

BACKGROUND OF THE INVENTION

Mathematical algorithms have been used to identify disease clusters and are a key component of syndromic surveillance software used to monitor for bioterrorism, as well as naturally occurring disease outbreaks. Examples of such algorithms are wide spread. One study of the use of algorithms of which Applicant is aware was made by DARPA. (See e.g. DARPA Bio-ALIRT Program Technical Report, "Evaluation of Algorithms for Outbreak Detection Using Clinical Data from Five U.S. Cities" (Oct. 15, 2004).

With particular relevance to this invention, a statistical method for quality improvement in industry is known as the "Fast Initial Response Cumulative Sum" (FIR CUSUM) method. This method is well known and is explained in detail, for example, in Ryan, T P. "Statistical Methods for Quality Improvement" John Wiley & Sons, New York, (1989) pp. 110-112.

The standard FIR CUSUM test statistic calculates the deviations q from the moving mean ($x_{bar}$) on each day (t). The value $S_t$ (q) accumulates these deviations from the mean ($q_t$), but only if they exceeded the mean by a threshold value (k). When the accumulated sum of deviations exceed a preset limit h, a "signal" is generated, and the sum, $S_t$, is reset to a starting value, $S_{reset}$, for analyses continuing on succeeding days. All deviations ($q_t$), thresholds (k) and limits (h) are expressed in standardized units (sigmas).

$$S_0 = 0$$

$$S_t(q) = \text{Max } [0, S_{t-1} + q_t - k]$$

h=threshold value

If $S_t(q) > h$ then reset to $S_t(q) = S_{reset}$ where $q_t = \dfrac{(x_t - x_{bar})}{(\text{std. deviation})}$ Attempts have been made to apply the standard FIR CUSUM procedure to the problem of detecting and rapidly identifying the onset and outbreak of diseases. Nonetheless, there are many limitations of this standard FIR CUSUM procedure when applied to syndromic surveillance data. By way of example only and not by limitation, some of the weaknesses of the FIR CUSUM are listed as follows:

1) The user or programmer must specify an "interval width", period of time for calculating the moving mean and standard deviation. The user must also specify the three model parameters (h, k, and $S_{reset}$). However, the parameter values with the "best" sensitivity and specificity depend on the type, shape, amplitude and duration of the outbreak one wishes to detect. These characteristics of outbreaks are different for each disease and depend on the mode of exposure, the magnitude of exposure, the location of exposure, and numerous other variables that cannot be known in advance.
2) The known FIR CUSUM procedure weights all data in the moving average window equally, making no allowance for the natural weekly periodicity seen in many healthcare settings.
3) The mean & standard deviation of the known FIR CUSUM procedure are heavily influenced by outliers, including zero values (in practice, zeros frequently represent missing data).
4) The known FIR CUSUM procedure can not quantify the "unusualness" or public health importance of a signal or flag. An outbreak involving 10 persons ill generates the same signal as one involving 200 people.
5) The known FIR CUSUM procedure does not quantify the duration of a signal or flag. In fact, it "resets" after every out-of-control signal is generated, so consecutive days with unusual values are frequently missed.

The FIR CUSUM method is not the only statistical method that exhibits these weaknesses when applied to real-world healthcare syndromes. Most of the available statistical methods that have been applied to outbreak detection were adapted from engineering and quality control applications, and have serious deficiencies in terms of sensitivity and specificity. Sensitivity is the proportion of true positives (true outbreaks detected). Specificity is the proportion of true negatives (false outbreaks not flagged). To maximize sensitivity and specificity, these algorithms require a long "training period" (a year or more of baseline data to "learn" what kinds of peaks comprise true positives and true negatives). This requirement for a large baseline set of data is often impractical because:

1) Systems to collect syndromic surveillance data are only now being developed.
2) There are many situations where it is impossible to obtain comparable data. For example, the Olympic Games cause a large influx of people into a small geographic area for a limited period of time, so no comparable "baseline data" exist.
3) These algorithms are tuned to detect outbreaks similar to those that have occurred in the past. Bioterrorism attacks may produce outbreaks unlike any we have seen in the past.

Also, the statistical methods proposed for outbreak detection are designed to detect only the beginning of a signal, and provide no subsequent information about the amplitude, shape or duration of the signal. Because these systems, including the FIR CUSUM, were developed for manufacturing and quality control settings, they assume that there is an easy way to confirm or identify the signal once it is detected. In disease surveillance, this assumption does not hold. There is rarely any easy way to confirm or identify the cause of any particular cluster, and the epidemiologist needs ongoing daily information about the amplitude, shape and duration of the outbreak to mount a proper investigation.

Thus, there is a need in the art for an apparatus and method for rapidly analyzing health related data that does not require a long "training period", that signals the outbreak of an illness quickly and that provides the user detailed information about the amplitude, shape and duration of the outbreak. It therefore is an object of the invention to provide an apparatus and method for providing rapid syndrome analysis that is easy to use and interpret and that is flexible and scalable.

SUMMARY OF THE INVENTION

Accordingly, the rapid syndrome analysis apparatus and method, according to one aspect of the invention, includes, in a computer, a computer readable medium with instructions for measuring a plurality of CUSUMs simultaneously and generating CUSUM data in response to an observed value. Instructions are also provided for comparing the CUSUM data with a predetermined plurality of threshold values. Further, instructions for generating a signal are provided when the CUSUM data exceeds any of the plurality of threshold values by a predetermined amount.

According to a further aspect of the invention, the computer readable medium includes instructions for ignoring CUSUM data which previously resulted in the generation of a signal. In a further aspect, the computer readable medium includes instructions for measuring a plurality of CUSUMs simultaneously wherein the instructions include instructions for measuring data from a group of time blocks measured from a current date. According to another aspect of this embodiment, the group of time blocks consists of seven days of data, fourteen days of data, twenty-one days of data and twenty-eight days of data measured from the current date. According to a further aspect of this invention, the instructions for measuring a plurality of CUSUMs simultaneously comprise instructions for measuring four separate CUSUMs for each of group of time blocks.

According to a further aspect of the invention, the computer readable medium with instructions for measuring a plurality of CUSUMS simultaneously and generating CUSUM data includes instructions for creating a moving baseline of CUSUM data with a declining weight given to older data. In accordance with another aspect, the instructions for measuring a plurality of CUSUMs simultaneously and generating CUSUM data includes instructions for ordering the CUSUM data for a current date such that days that are the same day of the week as the current date are given more weight. In another aspect of the invention, the instructions for comparing the CUSUM data with a predetermined plurality of threshold values includes instructions for four separate threshold values increasing from lowest to highest.

According to a further aspect of the invention, instructions for generating a signal include instructions for generating a "trimmed weighted" mean and sigma. According to a further aspect, the instructions for generating a trimmed weighted mean and sigma include instructions for excluding the highest and lowest percent of values. According to a further aspect, the instructions for generating a trimmed weighted mean and sigma include instructions for excluding certain zero values. According to another aspect, the invention includes instructions for calculating the duration of an event identified by one or more signals. According to a further aspect, instructions are provided for estimating the number of people ill with regard to an event identified by one or more signals. According to a further aspect of the invention, instructions are provided for generating data on the amplitude, shape and duration of an event identified by a signal.

In another embodiment of the invention, in a computer, a computer readable medium for providing rapid syndrome analysis includes instructions for measuring a plurality of CUSUMs simultaneously and generating CUSUM data with a moving baseline over a set period in response to an observed value. Instructions are also provided for comparing the CUSUM data with a predetermined plurality of threshold values. Further, instructions are provided for generating a signal when the CUSUM data exceeds any of the plurality of threshold values by a predetermined amount and, instructions are provided for generating a trimmed mean and sigma such that CUSUM data which previously resulted in the generation of a signal is excluded.

In another aspect of the invention, the instructions for measuring the plurality of CUSUMs simultaneously include instructions for measuring data from a group of time blocks measured from a current date wherein the group of time blocks consists of seven days of data, fourteen days of data, twenty-one days of data and twenty-eight days of data measured from the current date. In another aspect of the invention, the instructions for generating a trimmed mean and sigma include instructions for excluding certain zero values.

In another embodiment of the invention, a method for providing rapid syndrome analysis includes the steps of measuring a plurality of CUSUMs simultaneously and generating CUSUM data with a moving baseline over a set period in response to an observed value. Next the CUSUM data is compared with a predetermined plurality of threshold values and a signal is generated when the CUSUM data exceeds any of the plurality of threshold values by predetermined amount. Finally, a trimmed weighted mean and sigma are generated such that CUSUM data which previously resulted in the generation of a signal is excluded.

In another aspect of this invention, the step of measuring a plurality of CUSUMs simultaneously includes the step of measuring data from a group of time blocks measured from the current date wherein the group of time blocks consists of seven days of data, fourteen days of data, twenty-one days of data and twenty-eight days of data measured from the current date. In another aspect of the invention, the step of generating a trimmed mean and sigma includes the step of excluding certain zero values.

In another aspect of the invention, the instructions for generating flags include instructions for flagging consecutive days so that ongoing outbreaks continue to generate daily flags until the number of observed cases begins to decline.

DESCRIPTION OF THE DRAWINGS

Other objects, features and advantages of the present invention will become more fully apparent from the following detailed description of the preferred embodiments and the accompanying drawings in which:

FIG. 2 is an illustration of the sixteen separate CUSUMs measured in accordance with a preferred embodiment of the present invention;

FIG. 5 is a table of example calculations for four days illustrating the function of the analysis apparatus and method of the present invention.

DETAILED DESCRIPTION OF THE INVENTION

Figure 1:
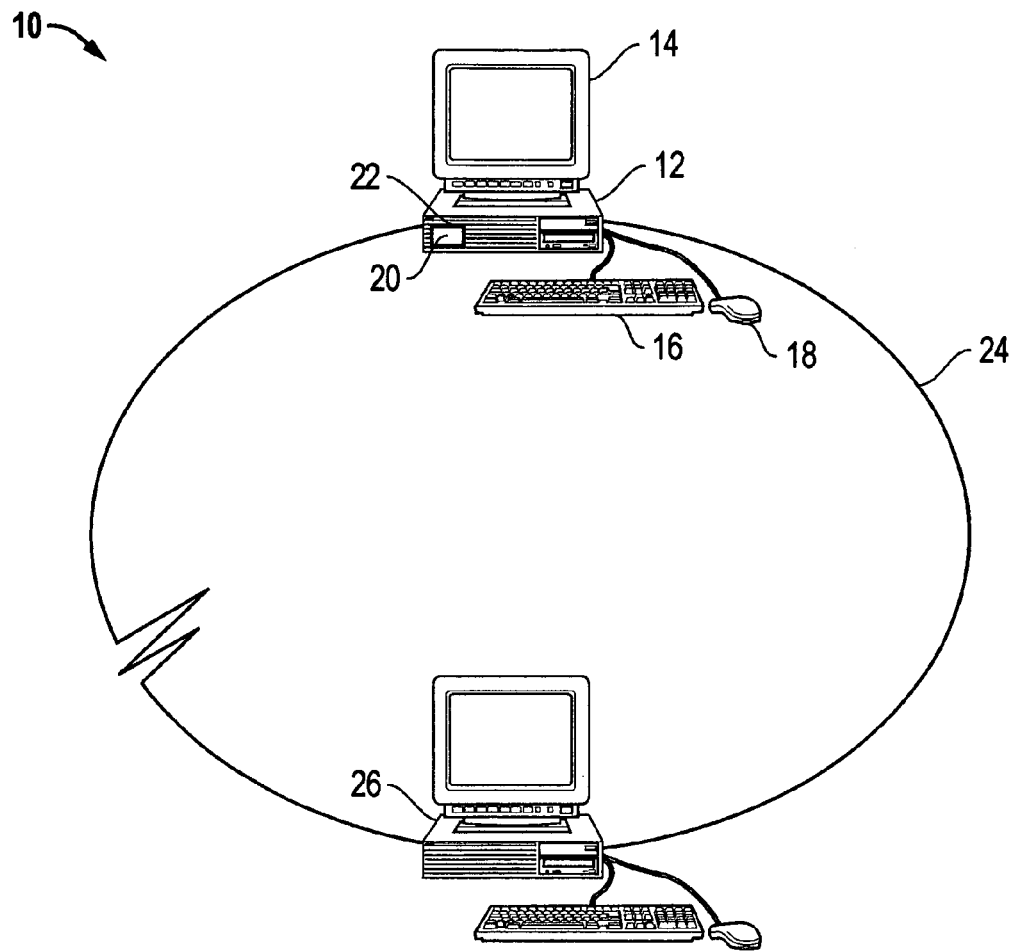
FIG. 1 is a schematic of the rapid syndrome analysis apparatus of the present invention in use with a computer.

The preferred embodiment of the present invention is illustrated by way of example in FIGS. 1-3 and 5. With specific reference to FIG. 1, the rapid syndrome analysis apparatus and method 10 of the present invention, according to one embodiment, is used with a computer 12. Computer 12 includes monitor 14, keyboard 16, mouse 18 and connections therefore all as known in the art. Computer 12 may be any computer now known or hereafter developed for manipulating data. Computer 12 includes software 20, as known, on computer readable medium 22. Computer readable medium 22 includes software 20 on any medium such as a disc, cd, dvd or the like. The software 20 includes instructions for manipulation of data as will be more fully discussed hereafter.

FIG. 1, shows computer 12 connected to network 24. Network 24 may be an intranet, internet or any other network now known or hereafter developed. By means of network 24, computer 12 may be connected to any number of other computer devices 26. Computer devices 26 may be PCs, PDAs, cell phones or any other computing device now known or hereafter developed. Computer devices 26 may send observed data to computer 12 or receive data from computer 12 or both. For example only and not by way of limitation, multiple computer devices 26 may input observed data to computer 12 which then applies software 20 to the data. Computer 12 then sends the manipulated data, as will be discussed more fully hereafter, to other computer devices 26 operated, for example only, by medical doctors, the CDC, emergency centers and the like.

Referring now to FIG. 2, a preferred embodiment of the rapid syndrome analysis apparatus and method 10 includes the simultaneous analysis of multiple parameters. FIG. 2 shows that the preferred embodiment analyzes sixteen different CUSUMs 28 comprised of interval 30, H 32, K 34 and reset value 36. Instead of a single interval 30 as known in the prior art, Applicant has selected a group of time blocks as intervals 30. According to one aspect of the invention, there are four time blocks of seven, fourteen, twenty-one and twenty-eight day intervals.

Further there are four different values of H 32, K 34 and reset value 36 for each of the four time block intervals 30. Referring to FIG. 2, the first row 38 is the first of four parameters for the seven day interval 30. In row 38, the value of H 32 is "3.0". The H 32 value is the user's selected preset limit above which a signal 40 is generated. Here, H 32 is three times the threshold value K 34. In row 38, the threshold value for K 34 is 1.75. As will be discussed more fully hereafter, when observed data results in a value of H 32 of three times K 34, a signal 40 is generated. According to one embodiment, the signal 40 in such a case is a "Blue" flag 42. In such a case, the reset value is one-half of H 32, which, in row 38, is "1.5", all as will be discussed more fully hereafter.

Row 44 is the second set of parameters for the seven day interval 30. Here, H 32 is "4.0", K 34 is "2.50" and the reset value 36 is "2.0". Should observed values result in a number equal to or greater than four times K 34 in row 44, a signal 40 is generated. In this case the signal 40 is a Yellow flag 46.

Rows 48 and 50 are the third and fourth set of parameters for the seven day interval 30. An Orange flag 52 and a Red flag 54 is generated when the observed data results in a number the same or greater than the H 32 values on those rows.

As can be appreciated, Applicants invention, according to one embodiment, provides for the simultaneous measurement of multiple CUSUMs. These multiple CUSUMs are compared to a plurality of threshold values. This is an important aspect of the invention in that it enables the user to identify outbreaks of a wide variety of unknown types quickly and repeatedly as will be discussed more fully hereafter.

In another embodiment, as can be seen from FIG. 2, sixteen separate CUSUMs are provided based on four separate blocks of time and four separate measurements each. According to a preferred embodiment, the blocks of time are multiples of seven days covering one, two, three, and four weeks as illustrated.

The formula for each of the cumulative sums(CUSUMs) according to the present invention is:

$$S(t)=S(t-1)+Q(t)+(K)$$

where S(t) is the CUSUM of the current day and
S(t−1) is the CUSUM from the day before the current day;

$$Q(t)=(X-\text{Mean}_{weighted})/(\text{Sigma}_{weighted}),$$

where X=the observed value for the current day (t),
Mean$_{weighted}$=weighted average of included interval values
Sigma$_{weighted}$=weighted standard deviation of included interval values;
K=threshold as adjusted as set forth in FIG. 2 for signal 40 color and Interval 30.

When S(t) is greater than H 32, the appropriate signal 40 color flag is generated and the reset value 36 is used as S(t−1). For an S(t) that is negative, the reset value 36 is zero.

As used herein, the term "CUSUM data" includes all the elements, terms and results of these formulas as utilized by the invention set forth herein.

Applicant's rapid syndrome analysis apparatus, according to one embodiment, uses intervals 30 that are multiples of seven days and according to a further embodiment, it weights each day in a moving baseline window differently in order to minimize the effects of weekly periodicity. Applicant's invention uses no 'guard band,' which means the baseline interval begins with the day immediately prior to the "Test Date." Each day in this interval is given a linearly declining weight in the following order: Days that are the same day of the week as the "Test Date" are weighted most heavily, followed by all remaining values (most recent to least recent). For example, if the test date is Monday, then a fourteen day interval 30 moving average is calculated using the weights Last Monday=14, 2-weeks-ago Monday=13, Yesterday (Sunday)=12, Day Before Yesterday (Saturday)=11, Last Friday=10, Last Thursday=9, Last Wednesday=8, Last Tuesday=7, 2-weeks ago Sunday=6, 2-weeks-ago Saturday=5, 2-weeks-ago Friday=4, 2-weeks-ago Thursday=3, 2-weeks-ago Wednesday=2, 2-weeks-ago Tuesday=1.

Further, according to one embodiment, a "trimmed weighted" mean and standard deviation are calculated to remove the influence of outliers on these statistics as follows:
  a. Extreme values are excluded. "Extreme" is defined as the highest and lowest (100/Interval) percent of values. For a seven day interval 30, this is the highest and lowest 14% of values. For a twenty-eight day interval 30, this is the highest and lowest 3.5% of values; and/or
  b. Only non-flagged days prior to the current date are included. That is, the Baseline Interval 30 is extended back from the "Test Date" until it includes the required seven, fourteen, twenty-one, or twenty-eight non-flagged values.
  C. Zero values are excluded from the calculation of the mean but they are included in the standard deviation unless the value zero is within 4 sigmas of the last calculated moving weighted mean. This is a very important and non-obvious improvement of the Applicant's invention over the prior art.

Still further, once a signal (flag) 40 is generated, consecutive daily values of equal or higher value continue to generate daily flags 40. Daily signals 40 continue to be generated as long as daily values stay above the mean. This is because, regardless of the value of any CUSUM, if a daily value is greater than the moving mean, then flags are only allowed to decline by a certain value (V) each day. V is calculated by the following formula:

$$V = \text{Integer}(x_{t-1}/x_t)$$

where $x_t$=today's observed value, and
$x_{t-1}$=yesterday's observed value

As a result, Applicant's invention enables users to determine the duration of an outbreak which is another important and non-obvious improvement of the Applicant's invention over the prior art. The duration of the current outbreak is estimated to help the user appreciate its significance. The "duration" is calculated in accordance with Applicant's invention as:

$$\text{duration} = \text{\# of consecutive non-zero flagged days.}$$

In accordance with Applicant's invention the "unusualness" or "seriousness" of the outbreak is also easily capable of determination. The "unusualness" of a signal is identified by color coding. In order of increasing "unusualness," flags have increasing weights $(f_{blue})=1$, $(f_{yellow})=2$, $(f_{orange})=3$, and $(f_{red})=4$.

Figure 3:
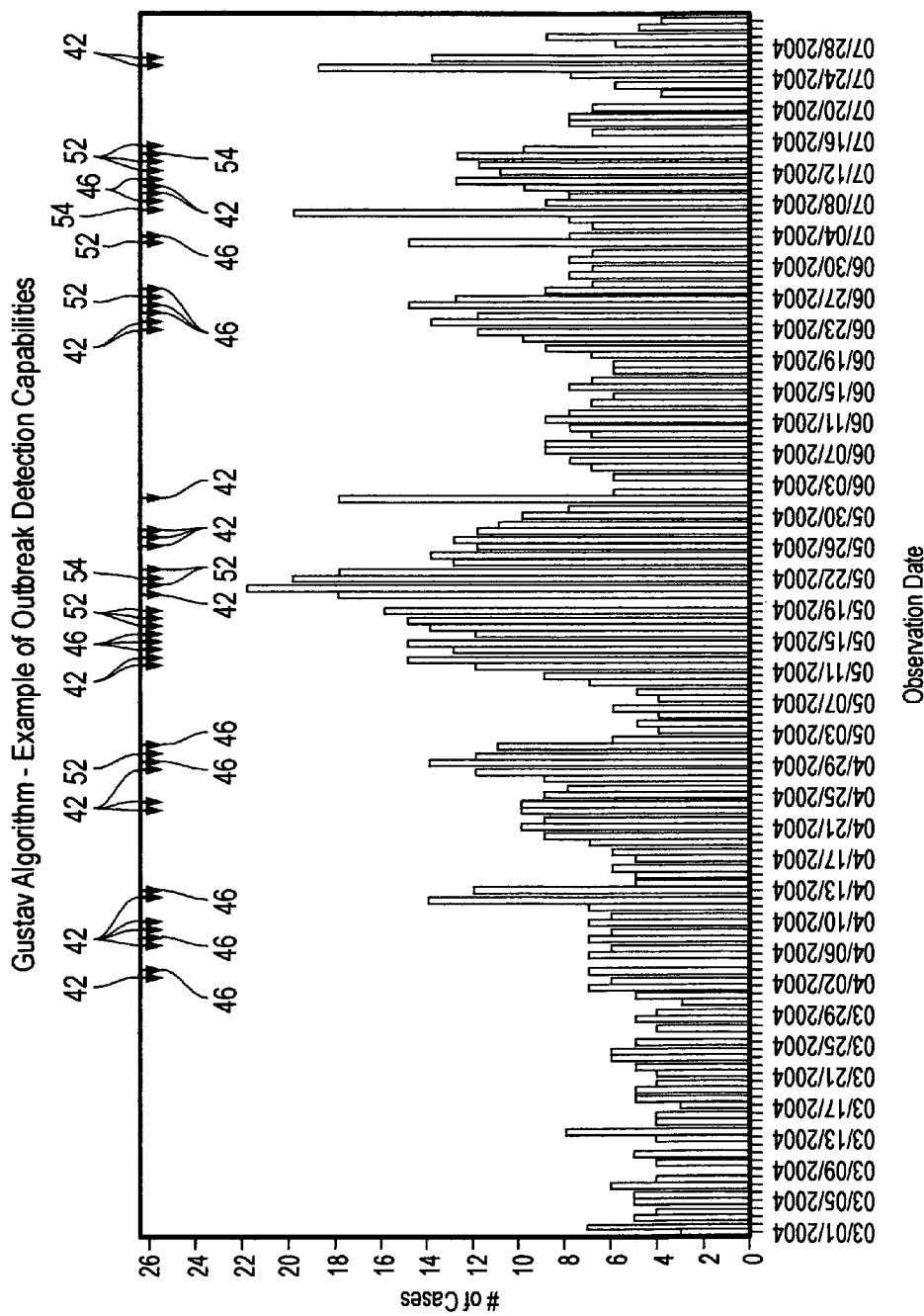
FIG. 3 is a graph illustrating the unique analysis capabilities of the present invention.

Still further, for count data, it is also possible with Applicant's invention to estimate the number of people ill in the current outbreak so as to further help the user appreciate its significance. The "number ill" is calculated in accordance with Applicant's invention as follows:

$$\text{Number ill}_{estimated} = (0.5)(X_{bar-max})(\text{sigma}_{max})(f_w)(\text{duration})$$

where $X_{bar-max}$=weighted mean of interval producing a highest flag
sigma$_{max}$=weighted standard deviation of interval producing the highest flag
$f_w$=weight of highest flag Referring now to FIG. 3, a graphic illustration of the power and sensitivity of Applicant's invention is provided. This example begins with a stable baseline (the moving trimmed weighted mean remains between 4.5 and 5.0) for 31 days in March. Beginning on April 1 and continuing to April 11, there is a very subtle outbreak as the baseline rises to 6.5. Notice how robust Applicant's invention is despite "dropped" or missing data. That is, even though March contains 3 days with zero cases, the trimmed moving weighted means remain very stable. Nonetheless, the rapid syndrome analysis apparatus and method 10 of the present invention is still able to detect the onset of this early April outbreak and the fact that it is continuing, even though there is a zero value on April 4 right in the middle of the outbreak.

Referring now to FIG. 5, an example of the operation of the process of the invention is set forth in table form. It is understood that only a four day period, March 31 to April 3, and only one interval 30, the seven day interval, is detailed. Nonetheless the operation of the process will be easily understood to apply to multiple intervals as set forth in the invention.

The table includes the following columns: Flag 56, color 58, interval 30, observed date 60, observed value 62, weighted moving average 64, weighted moving sigma 66, S (t–1) 68, Q 70, K 34, Adjust 72, CUSUM S(t) 74, H 32 and FIR CUSUM reset value 36. The operation of the formulas for determining these separate elements is as set forth above.

Referring to FIG. 5 specifically, it can be seen that an observed value 62 of 5 on March 31 results in a CUSUM S(t) 74 of a negative value for all four of the signal 40 calculations. In accordance with the invention, whenever the CUSUM S(t) 74 is less than zero, negative, the reset value 36 is zero and no flag 56 is raised for any color 58 for that seven day interval 30.

An observed value 62 of 7 raises the blue color 58, for example, to a CUSUM S(t) of 2.8520 which is not greater than the H 32 value of 3 but it is a positive number that becomes the new S(t–1) 68 for the next day April 2.

Even though the observed value 62 decreases to 6 on April 2, it is sufficient in accordance with Applicant's invention, however, to result in a CUSUM S(t) 74 of 3.7315 which is greater than the blue color requirement of 3 for H 32. Thus a color 58 blue flag 56 is shown in the table.

By way of further explanation, the CUSUM S(t) 74 is the result of the addition of the previous day's CUSUM or reset value S(t–1) 68 plus Q 70 plus K 34 plus adjust 72. Adjust 72 in the Table in FIG. 5 is a positive and when added to the K 34 in the table results in a K 34 identical to the K 34 in the table set out in FIG. 2. Applicant has arranged the table in FIG. 5 so that it is possible simply to add from left to right and determine CUSUM S(t) 74 logically. Thereafter it is possible to visually make the comparison with H 32. Because the CUSUM S(t) 74 on April 2 is more than color blue 58 three H 32, the blue flag 56 is raised and the reset value 36 is one-half of H 32 or 1.5.

Continuing with the explanation, an observed value 62 on April 3 of 7, now results in both a blue and yellow color 58 flag.

Referring to FIG. 3, in accordance with Applicant's invention, only the highest flag 56 is shown for any one day, which in this case is a yellow flag 46.

Continuing now with reference to FIG. 3, on April 12-13 Applicant's invention detects an obvious outbreak above and beyond the baseline that is higher than at the beginning of the month.

April 21-24 Applicant's invention detects another subtle outbreak, with 9 and 10 cases per day, and on April 28-May 1 there is a 2nd outbreak superimposed on this outbreak. Importantly, the present invention detects the second outbreak because it discards flagged values from the calculation of trimmed moving weighted means and sigmas, and marks the second outbreak with an Orange flag.

A huge outbreak occurs from May 11-May 28, which shows that the invention continues to flag every day of an ongoing outbreak (unlike the regular prior art CUSUM which only flags the onset, and then resets to 0). Note also that even though there is a "dropped" or missing data point in the middle of this huge outbreak (May 19), the apparatus and method 10 of the present invention quickly recognizes that this outbreak has not ended—giving a red flag 3 days later on May 22.

Figure 4:
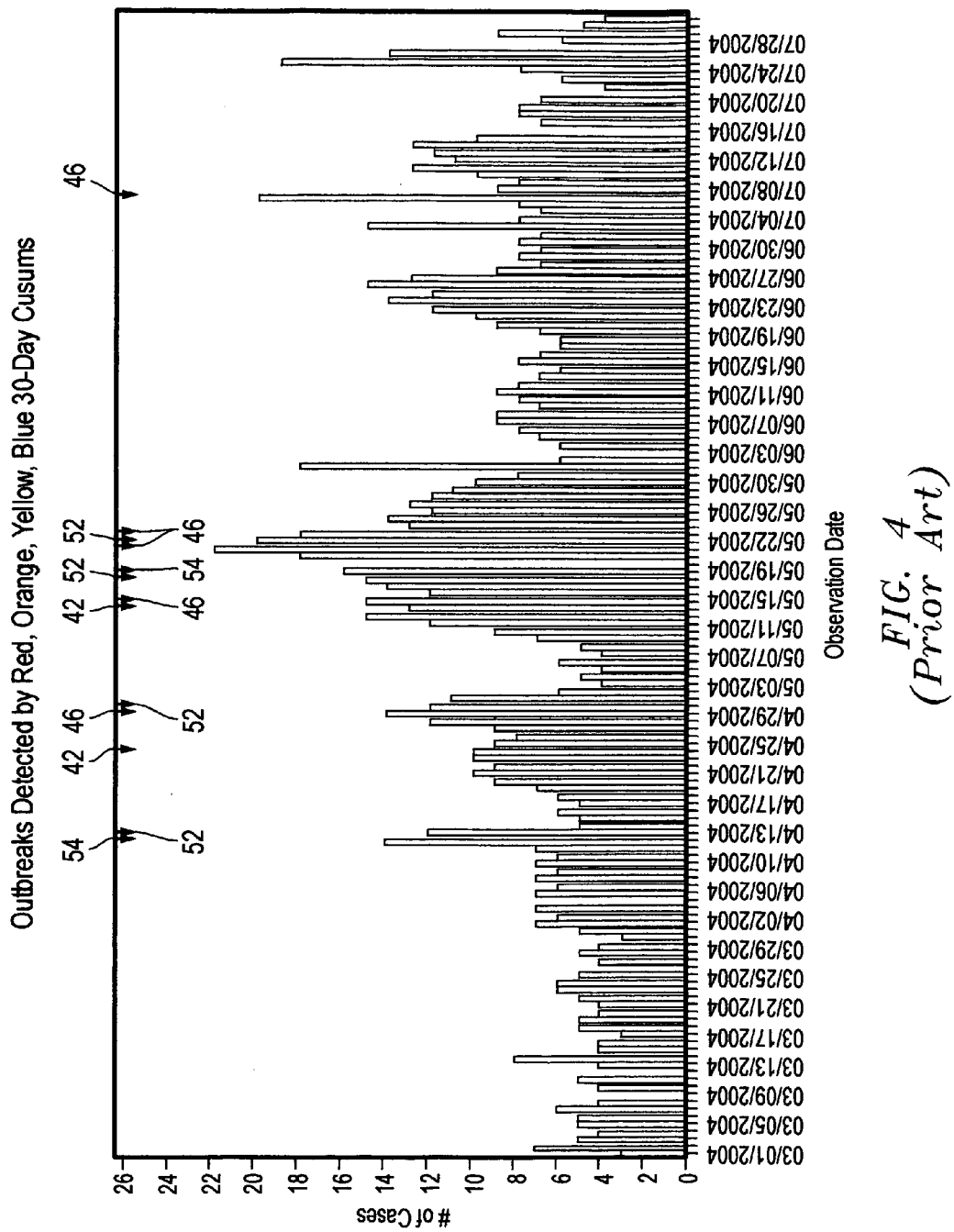
FIG. 4 is a graph of a compilation of four Prior Art CUSUMs limited to 30 day periods and single sets of parameters.

On June 1 Applicant's invention detects a one-day outbreak that occurs during the tail of the previous outbreak. These are very difficult to detect by any method other than the present invention because moving means by definition lag several to many days behind the day being tested. Therefore, with previous detection algorithms, the large mean and sigma from the preceding outbreak typically will mask any outbreak occurring in the 7-14 days following its peak. See for example the same data as analyzed by Prior Art systems shown in FIG. 4. No flag of any kind is indicated for June 1.

In June and July, it is apparent that the baseline (or background level) of cases has risen and the trimmed moving weighted mean varies between 7.5 and 8.0 cases per day. The present invention adjusts for this increased baseline and does not flag outbreaks at this level. Note that this level is higher than the outbreak level (6.5) detected in early April and shows that the present invention is still sensitive to a changing baseline. Nonetheless, it does pick up the outbreak on June 22-27 It also recognizes 1-day outbreaks on July 3 and July 7.

A large outbreak occurs from July 10-15 and is flagged with orange and red flags. Although its amplitude is not very high (13 cases on July 11), its duration is rather long (6 days), and it affects a large number of patients. This is why Applicant's invention generates a red flag.

The last outbreak on July 25-26 has a higher amplitude but only lasts for 2 days, so it generates 2 blue flags. The examples in July show the importance of using trimmed weighted means and sigmas. The wild fluctuations in the number of cases per day, including 3 days with zeroes (missing data) would cause the untrimmed mean and sigma to be completely unreliable. See for example and comparison again, the Prior Art system shown in FIG. 4 for the same date and note that no signal is given. In fact, the Prior Art CUSUM-30 graph shown in FIG. 4 of these data show that only one of the regular 30-Day CUSUMs detects even a single outbreak in July. It should be noted that nowhere has Applicant even seen four separate CUSUMs overlayed in a single prior art system. They are presented this way in FIG. 4 simply to show that none of the prior art CUSUMs is any way as near as accurate and sensitive as the present invention. According to the preferred embodiment, Applicant's sixteen different CUSUMs allows users to identify disease outbreaks whether they have a very short incubation period (a few hours, like many toxic chemicals) a short incubation period (a few days, like many gastrointestinal diseases), an intermediate incubation period (7-14 days, like smallpox), or a long incubation period (21-28 days, like hepatitis). They also allow provide a way for the same system to detect 1 or 2-day outbreaks (like the typical food borne outbreak) as well as 1 or 2-month outbreaks (like the typical influenza outbreak every year).

Because it uses a plurality of CUSUMs, according to one embodiment, sixteen different combinations of H, K and reset values, the rapid syndrome analysis apparatus and method 10 is not limited to detecting certain specific diseases. In fact, Applicant currently monitors the eleven different syndromes listed below. Note that two of these (neuro-toxic and radiation sickness) are not related to infectious diseases, but rather to chemical toxins or radiation threats.

1) Flu-like syndrome
2) Pox-like Rash syndrome
3) Pulmonary syndrome
4) Gastrointestinal syndrome
5) Hepatitis-like syndrome
6) Neuro-Toxic syndrome
7) Encephalitis-like syndrome
8) Systemic-Illness syndrome
9) Sepsis-DIC syndrome (DIC=disseminated intravascular coagulation)
10) Radiation Sickness syndrome
11) SARS-like syndrome Applicant's invention is of practical importance because there is a need for a mathematical technique, for example only, to identify disease outbreaks in daily healthcare surveillance data. The types of data that could be analyzed using this algorithm include daily counts of:

1) Symptoms of patients visiting hospital emergency departments
2) Over-the-counter medications purchased at pharmacies
3) Absences from school due to illness
4) Laboratory cultures of infectious pathogens
5) Cases of unusual or serious disease among humans reported to the health department
6) Cases of unusual or serious disease among animals reported to veterinarians Obviously, any desired observable data can be utilized as the "daily count" for the purposes of the invention. In that regard, the description of the present embodiments of the invention have been presented for the purposes of illustration but are not intended to be exhaustive or to limit the invention to the form disclosed. Many modifications and variations will be apparent to those of ordinary skill in the art. As such, while the present invention has been disclosed in connection with the preferred embodiment thereof, is should be understood that there may be other embodiments which fall within the spirit and scope of the invention as defined by the following claims.

What is claimed is:

1. A non-transitory computer readable medium which allows a computer to provide rapid syndrome analysis comprising:
   a) instructions for measuring a plurality of cumulative sums (CUSUMs) over a plurality of time blocks, each time block being a time interval with a duration from the current date that is different than the duration of the time interval of the other time blocks from the current date, wherein the multiple CUSUMs for a given time block are measured simultaneously and generating CUSUM data in response to an observed value wherein the CUSUM for each time block is generated as follows:

$$S(t)=S(t-1)+Q(t)+(K)$$

wherein S(t) is the CUSUM for the current date and S(t−1) is the CUSUM for the date before the current date which is selected from the group consisting of the calculated CUSUM or a reset value, Q(t) is a function of the observed value for the current day less the weighted mean of the observed values for the time block and K is a predetermined threshold for the time block;
   b) instructions for comparing said CUSUM data with a predetermined plurality of threshold values for each time block; and
   c) instructions for generating a signal when said CUSUM data exceeds any of said plurality of threshold values by a predetermined amount.

2. The computer readable medium of claim 1 wherein said group of time blocks consists of: seven days of data, fourteen days of data, twenty-one days of data and twenty-eight days of data measured from the current date.

3. The computer readable medium of claim 2 wherein said instructions for measuring a plurality of CUSUMs over a plurality of time blocks comprises instructions for measuring multiple separate CUSUMs for each of said group of time blocks.

4. The computer readable medium of claim 1 wherein the instructions for generating a signal include instructions for generating a trimmed moving weighted mean and trimmed standard deviation (Sigma).

5. The computer readable medium of claim 4 wherein the instructions for generating a trimmed moving weighted mean and Sigma include instructions for excluding a determined percentage of extreme values.

6. The computer readable medium of claim 4 wherein the instructions for generating a trimmed moving weighted mean and trimmed moving Sigma include instructions for excluding certain zero values.

7. The computer readable medium of claim 1 further comprising instructions for ignoring observed data which previously resulted in the generation of a signal.

8. The computer readable medium of claim 1 wherein said instructions for generating a signal include instructions for continuing to generate a signal until the observed value declines.

9. The computer readable medium of claim 1 wherein the instructions for measuring a plurality of CUSUMs over a plurality of time blocks and generating CUSUM data includes instructions for creating a moving baseline of CUSUM data with a declining weight given to older data.

10. The computer readable medium of claim 1 wherein the instructions for measuring a plurality of CUSUMs over a plurality of time blocks and generating CUSUM data includes instructions for ordering the CUSUM data for a current date such that days that are the same day of the week as the current date are given more weight.

11. The computer readable medium of claim 1 wherein the instructions for comparing said CUSUM data with a predetermined plurality of threshold values includes instructions for four separate threshold values increasing from lowest to highest.

12. The computer readable medium of claim 1 further comprising instructions for calculating the duration of an event identified by one or more signals.

13. The computer readable medium of claim 1 further comprising instructions for estimating the number of people ill with regard to an event identified by one or more signals.

14. The computer readable medium of claim 1 further comprising instructions for generating data on the amplitude, shape and duration of an event identified by a signal.

* * * * *